US008406491B2

(12) United States Patent
Gee et al.

(10) Patent No.: US 8,406,491 B2
(45) Date of Patent: Mar. 26, 2013

(54) IMAGE REGISTRATION METHOD FOR MEDICAL IMAGE SEQUENCES

(75) Inventors: Timothy F. Gee, Knoxville, TN (US); James S. Goddard, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 1355 days.

(21) Appl. No.: 12/117,478

(22) Filed: May 8, 2008

(65) Prior Publication Data

US 2009/0324031 A1 Dec. 31, 2009

(51) Int. Cl.
*G06K 9/00* (2006.01)
(52) U.S. Cl. ........ 382/128; 382/130; 382/131; 382/154; 382/173; 382/180; 382/195; 382/285; 382/293; 382/308
(58) Field of Classification Search .......... 382/128–132, 382/154, 173, 180, 195, 285, 293–300, 308
See application file for complete search history.

(56) References Cited

U.S. PATENT DOCUMENTS

2008/0292194 A1* 11/2008 Schmidt et al. ............... 382/217
2009/0171184 A1* 7/2009 Jenkins et al. ................ 600/411

OTHER PUBLICATIONS

Canny, John, "A Computational Approach to Edge Detection," IEEE Transactions on Pattern Analysis and Machine Intelligence, Nov. 1986, pp. 679-698, vol. PAMI-8, No. 6.
Haralick, Robert M., et. al., Computer and Robot Vision, vol. I, 1992, Addison-Wesley Publishing Company, Reading, Massachusetts.

* cited by examiner

*Primary Examiner* — Wesley Tucker
(74) *Attorney, Agent, or Firm* — Scully, Scott, Murphy & Presser, P.C.

(57) ABSTRACT

Image registration of low contrast image sequences is provided. In one aspect, a desired region of an image is automatically segmented and only the desired region is registered. Active contours and adaptive thresholding of intensity or edge information may be used to segment the desired regions. A transform function is defined to register the segmented region, and sub-pixel information may be determined using one or more interpolation methods.

28 Claims, 5 Drawing Sheets

IMAGE REGISTRATION METHOD FOR MEDICAL IMAGE SEQUENCES

STATEMENT REGARDING FEDERALLY SPONSORED RESEARCH OR DEVELOPMENT

This invention was made with government support under Contract No. DE-AC05-00OR22725 awarded by the U.S. Department of Energy. The government has certain rights in the invention.

FIELD OF THE INVENTION

The present disclosure related to computer vision and image processing, and more particularly to image registration of low contrast image sequences for image sequences such as medical image sequences.

BACKGROUND OF THE INVENTION

Image registration refers to the process of coordinating two or more data sets representing images of the same scene or object at different times, different perspective, and/or by different sensing devices. Image registration is an important step for analyzing images, in which plurality of data obtained from different measurements exist. Medical image registration often involve dealing with non-rigid or elastic registration to adapt to deformation of the imaged subject, for example, due to breathing, blood flows, and other anatomical changes, etc.

Existing medical image registration methodologies of two dimensional (2D) image sequences utilize both linear and non-linear techniques. Those techniques have used landmarks, correlation, and mutual information to perform registration of general medical images. However, many sequences of medical images have low contrast features such as open surgical images showing organs and other tissue. The borders of the organs are not generally sharp and are difficult to locate using standard image processing techniques.

Researchers at the National Institutes of Health (NIH) have recorded 2D real-time infrared and visible optical images during exploratory surgery for both humans and animals. Those images record, for example, kidneys, livers, and other specific regions in the body for later thermal analysis of physiological changes. A major problem for the analysis is that movement occurs during the surgery due to respiration, blood flow, or mechanical motion from the surgical procedure. Those effects cause unacceptable alignment through the image sequence, making local temperature measurements impossible. The soft organs and tissues are not rigid bodies but have deformable surfaces. In addition, the organs themselves are 3D volumes with 3D motions. While medical image registration has been researched, the application of deformable registration to 2D time image sequences with non-rigid 3D structures has not been extensively studied.

In another aspect, intraoperative optical images of exposed organs in visible, near-infrared, and infrared (IR) wavelengths in the body have the potential to be useful for real-time, non-invasive assessment of organ viability and image guidance during surgical intervention. Relatively low cost, non-invasiveness and good specificity for physiological changes make optical imaging desirable for a variety of surgical procedures.

However, as mentioned above, the motion of the internal organs presents significant challenge for real-time data analysis of recorded two-dimensional video sequences. The movement of the kidney, liver, urethra, etc. observed during surgery due to respiration, cardiac motion, and blood flow, can be between 15 and 20 mm. In addition to mechanical shift of the tissue from the surgical intervention, the movements cause organ reflection in the image sequence, making optical measurements for further analysis challenging. Correcting alignment is difficult in that the motion is not uniform over the image, that is, the motion is not global over the image. Also, other artifacts, such as glare caused by illumination from surgical lights reflecting off of wet tissue surfaces (in the case of visible wavelength imaging) and evaporative cooling (in IR imaging), add random noise to the imagery, do not allow clear visualization of internal fiducial markers, and, therefore, make the task more difficult.

BRIEF SUMMARY OF THE INVENTION

A method and system for image registration are provided. The method in one aspect may comprise automatically segmenting a region of an image having a low contrast border with respect to region's surroundings in the image, for each of a plurality of images in an image sequence representing an object, said automatically segmenting step producing a plurality of segmented regions. The method may further comprise establishing an image from said plurality of images as a reference image, and defining a transform function to map a segmented region of said reference image with segmented regions of rest of said plurality of images. The method may also comprise mapping said segmented region of said reference image with said segmented regions of rest of said plurality of images, and determining sub-pixel information of said segmented regions of rest of said plurality of images using interpolation.

A method for image registration, in another aspect, may comprise automatically segmenting a region of an image having a low contrast border with respect to region's surroundings in the image. The automatically segmenting step is performed for a plurality of images in an image sequence representing an object. The automatically segmenting step produces a plurality of segmented regions. Each of the plurality of segmented regions respectively from the plurality of images represent the same object. The method may also comprise establishing an image from said plurality of images as a reference image, defining a transform function to map a segmented region of said reference image with segmented regions of one or more of remaining said plurality of images. The segmented region of said reference image and the segmented regions of one or more of remaining said plurality of images are obtained from said automatically segmenting step. The method may further comprise mapping said segmented region of said reference image with said segmented regions of said one or more of remaining plurality of images, and determining sub-pixel information of said segmented regions of plurality of images using interpolation.

A system for image registration, in one aspect, may comprise a processor, means for automatically segmenting a region of an image having a low contrast border with respect to region's surroundings in the image, for each of a plurality of images in an image sequence representing an object. Said automatically segmenting step produces a plurality of segmented regions. The system may further comprise means for establishing an image from said plurality of images as a reference image, and means for defining a transform function to map a segmented region of said reference image with segmented regions of rest of said plurality of images. The system may also comprise means for mapping said segmented region of said reference image with said segmented regions of rest of said plurality of images, and means for determining sub-pixel information of said segmented regions of rest of said plurality of images using interpolation. The means of the system may comprise, but are not limited to, computer-implemented or computer-executable or like mechanism such as software, firmware, hardware, and circuitry.

A program storage device readable by a machine or computer, tangibly embodying a program of instructions executable by the machine or computer to perform above-described method of image registration may be also provided.

Further features as well as the structure and operation of various embodiments are described in detail below with reference to the accompanying drawings. In the drawings, like reference numbers indicate identical or functionally similar elements.

DETAILED DESCRIPTION

A methodology is presented for image registration of low contrast image sequence. The methodology registers only a desired region within each image where the region has a low contrast border with respect to its surroundings. The methodology in one embodiment first segments areas of the image for which image registration needs to be performed. In one embodiment, methods such as active contours and adaptive thresholding of intensity or edge information may be used to segment the region having low contrast. Specifically, in one embodiment, Canny edge-based method for segmentation of the specific organ or region under study, along with a shape moment-based registration method for the segmented region are used.

After segmentation, features are extracted to perform the registration. In extracting features, metrics are calculated to determine the relative motion within the segmented region to a reference image. Briefly, a reference image refers to a base image, with which subsequent one or more images are overlaid, coordinated, or transformed. The metrics can be determined, for example, using moments, normalized correlation windows, landmark points using Lucas-Kanade method, and mutual information. The metrics are used to define a rigid or non-rigid warping of the pixels of the desired region of the image to bring it into alignment with the reference. Since those warpings require movement of pixel (image sample) information in non-integer pixel spacings, bilinear or bicubic interpolation or like may be used for resampling or interpolating the images.

In one embodiment, image registration for a plurality of image data sets such as an IR video is accomplished in two stages. The organ or region of interest is first automatically segmented throughout the image data sequence. This process may be accomplished by a combination of edge extraction and morphological operations that form a closed boundary of the organ. Then a shape-based registration algorithm is applied to the segmented organ to estimate the alignment error relative to a base image in the image sequence. These steps are detailed below.

The example image data sets used in the following description pertain to IR imaging sequences of porcine kidney, collected to evaluate renal ischemia, particularly focal perfusion deficits. Laparotomy with renal mobilization, hilar dissection, and identification of segmental branches were performed in six porcine models. An IR camera (3-5μ wavelengths) was directed at two exposed kidneys from 30 cm distance. Images (320×256×14 bits) were collected at the rate of one per second with 300-600 images per sequence.

Figure 1A:
FIG. 1A shows original infrared image of pig kidney from video sequence with varying contrast at kidney boundary.
Figure 1B:
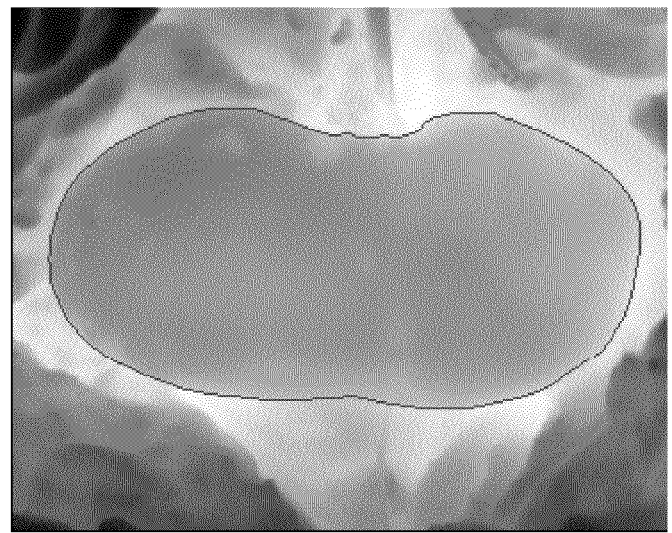
FIG. 1B shows an overlay of the kidney contour after having applied the segmentation methodology of the present disclosure.

FIG. 1A shows a baseline IR image of a pig kidney collected. An outline of the kidney edge generated by the segmentation method of the present disclosure is shown in FIG. 1B. At this boundary, the contrast with the surrounding tissue varies from good to just visible.

Figure 2:
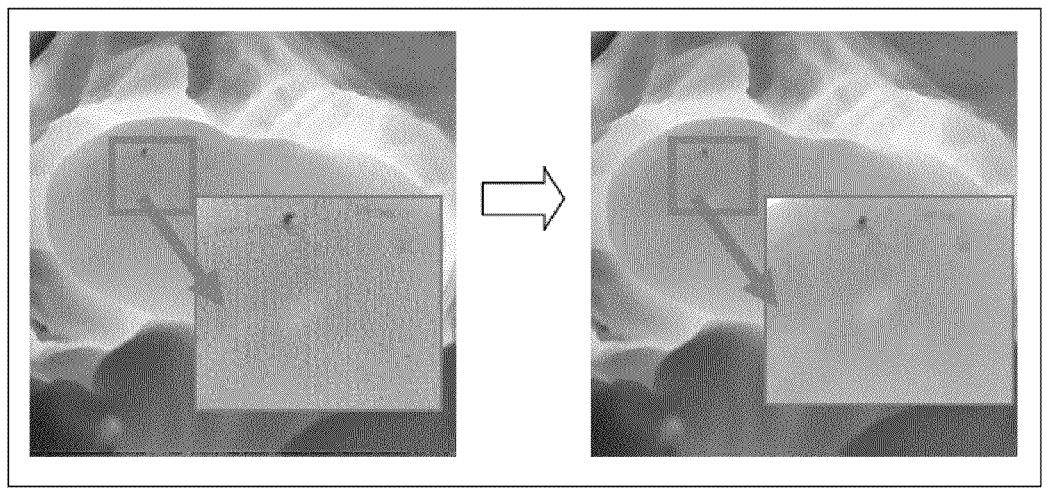
FIG. 2 illustrates two dimensional median filtering with three by three window applied to each input image to reduce fixed pattern noise as shown in the image inset.

As a preprocessing step, 2D median filtering is applied to remove fixed pattern noise present after calibration of the IR images. The improved result is shown in FIG. 2.

In the acquired video, the kidney is moving in the foreground with the pig's other body organs in the background. The image content at the boundary of the kidney is changing slightly since the kidney is not fixed to the background at its edges. To achieve good video registration, the methodology of the present disclosure in one embodiment segments the organ from the background and considers it independently.

One embodiment of the methodology of the present disclosure achieves segmentation using a Canny edge finder followed by some morphological operations. Canny edge detection method is described in detail in Canny, John, "A Computational Approach to Edge Detection," IEEE Transactions on Pattern Analysis and Machine Intelligence, Vol. PAMI-8, No. 6, 1986, pp. 679-698, which is incorporated herein by reference in its entirety. Details of computer vision methodologies can be found in Haralick, Robert M., and Linda G. Shapiro, Computer and Robot Vision, Volume I, Addi-son-Wesley, 1992.

Figure 3A:
FIG. 3A shows the result following the Canny edge detection method.

FIG. 3A shows the result following the Canny edge detection method. From the Canny edge detection, a binary image is obtained, in which edge pixels have the value 1, and other pixels are 0. This image is the input of morphological operations performed to acquire the kidney as an object. The first operation is bridging which joins pixels of value 1 that are separated by only one zero pixel. This fills gaps in the kidney contour. In some cases, edge image may be dilated before bridging to allow bigger gaps to be filled. In these cases, the edge may be thinned afterward. Briefly, dilating enlarges the edge image.

After bridging, an image fill operation is performed that starts at the center of the kidney and inserts values of 1 until stopped by a continuous boundary of 1s. If the kidney boundary was extracted without gaps, then this operation creates a binary object describing the kidney. This procedure obtains the boundary with a high success rate. If there are gaps in the boundary, then the fill operation may fill a much greater area than the size of the kidney and may even fill the entire image. In such occasional cases, the method of the present disclosure may use the kidney object obtained from the previous frame.

Figure 3B:
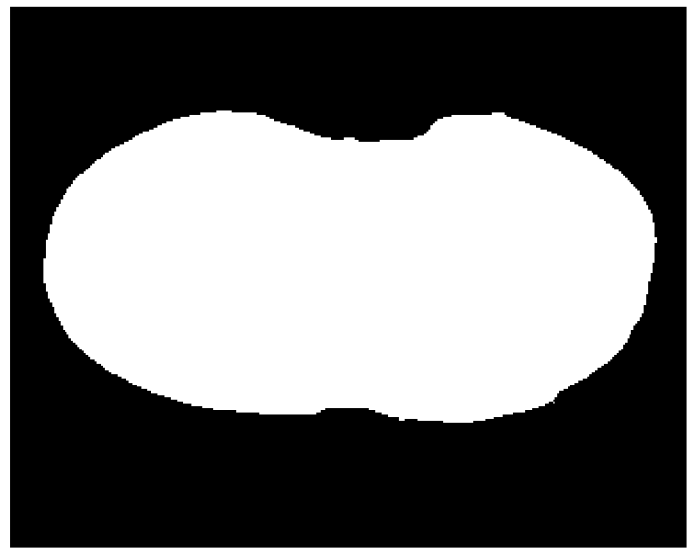
FIG. 3B shows the result, which is a single object that only describes the kidney shape and location.

After the image fill, binary connectivity analysis is performed so that the kidney can be identified as an object. An operation is then performed to fill any holes in this object, so that the kidney is completely covered. Additional morphological operations such as opening (erosion followed by dilation) are utilized to remove small appendages of the kidney that occur from background edges that are adjacent to the kidney. FIG. 3B shows the result, which is a single object that only describes the kidney shape and location.

The above-described steps located the image object, in this case, the kidney and its orientation. During the organ's movements, the background changes, and the kidney's location and rotation in the background changes, but the kidney's shape does not change significantly. Therefore, it is possible to perform registration using the object location and orientation that was extracted as described above. Methods other than tracking the image object's contour to segment the desired region may be used. For example, intensity textures or landmarks may be tracked within the kidney region for segmentation purpose.

Figure 4:
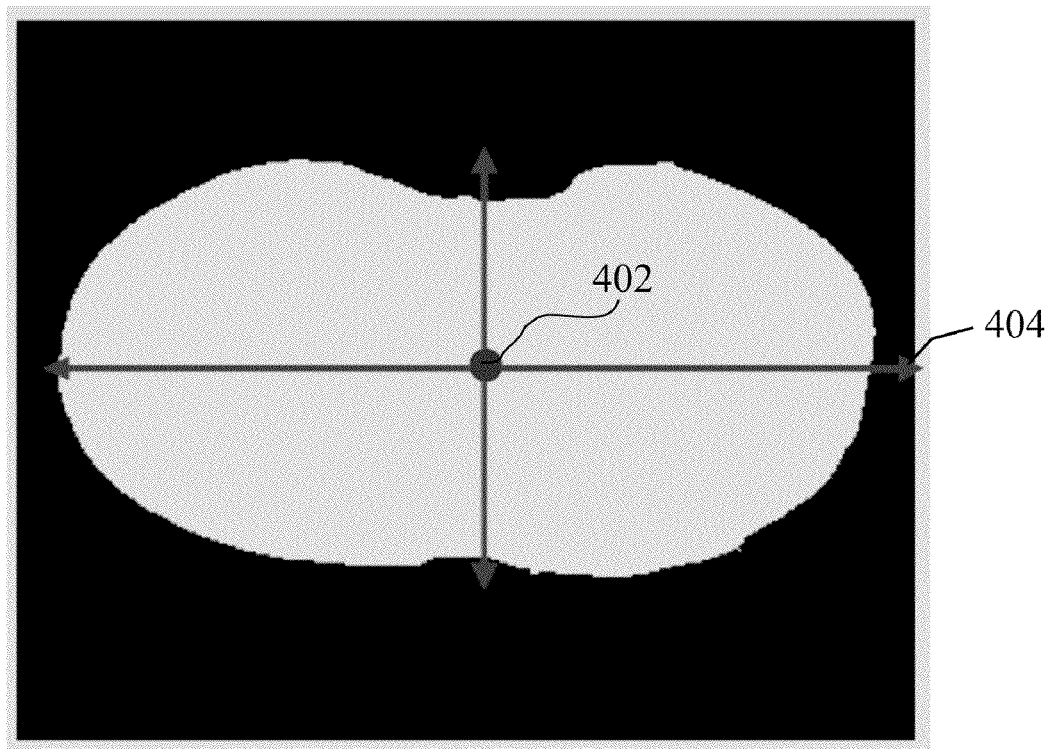
FIG. 4 illustrates first and second-order moments of the obtained binary object.

FIG. 4 illustrates first and second-order moments of the obtained binary object. Using the first and second-order moments, the location and orientation of the obtained binary object can be described. The first-order moments, or centroid (402), define the x and y coordinates of the object's center of mass. The second-order central moments can be used to define the object's axis of maximum elongation (404). Here, the shape is modeled as an ellipse, and the method finds the angle of the major axis of an ellipse with the same second-order central moments as the binarized kidney.

The segmented kidney object in the first frame of the image sequence is used as a reference. The registration of each following frame is then defined by the translation needed to shift the centroid and align the major axis to match the reference. This defines a homogenous transform to map intensity values from image points in the current frame to the corresponding locations of the reference image. Interpolation is used to determine and provide sub-pixel locations from the current frame. For example, bi-cubic interpolation or like may be used. Other interpolation methods may be utilized.

Figure 5:
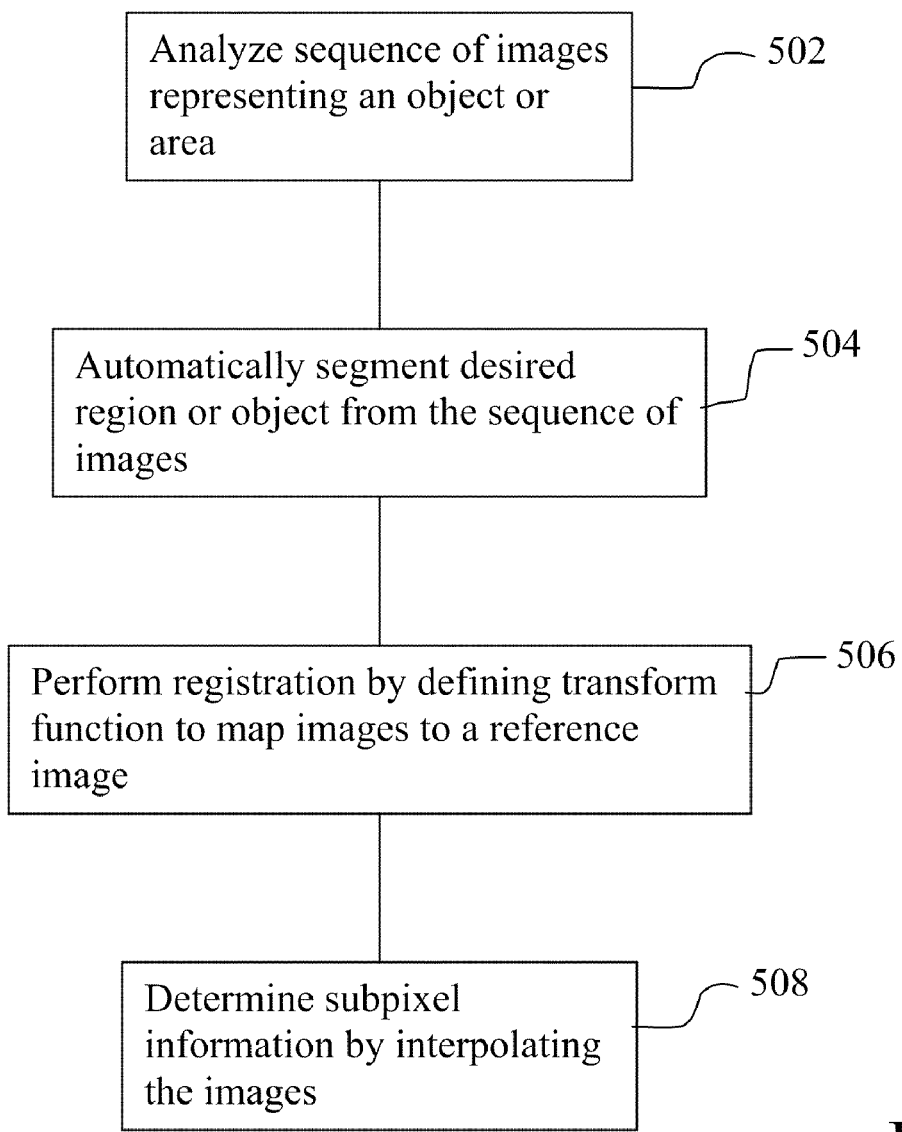
FIG. 5 is a flow diagram illustrating an image registration method of the present disclosure in one embodiment.

FIG. 5 is a flow diagram illustrating an image registration method of the present disclosure in one embodiment. At 502, the method starts with analyzing a plurality of images, for example an image sequence or a video sequence of an object, area, etc. As in the above example, the plurality of images may be of an organ in its surrounding anatomical background that is non-rigid and typically have a low contrast border with respect to its surroundings. Such medical images have low contrast and do not contain easily detectable distinct objects. At 504, a desired region in the image, in this case the organ, is segmented automatically from each of the images. Different algorithms may be used for segmentation. For example, the segmentation step may include adapting contour based segmentation methods to automatically segment the region from the low contrast image. In one embodiment, edge detection method such as the Canny edge detection may be used in combination with morphological operations as explained above.

Another segmentation method that may be used is active contour modeling (ACM) where the contour is calculated through an error minimization process. Additional steps of morphological dilation and erosion may be used to bridge across gaps in the contour as well as remove rough edges from the contour path.

In addition, before the segmentation step, the plurality of images may be processed to detect and remove noise from the images using any known or will be known noise filtering methodologies. For instance, 2D median filtering may be applied to remove fixed pattern noise is present after calibration of the IR images.

At 506, registration is performed using the segmented regions, for aligning the plurality of segmented regions into the same coordinates. In one embodiment segmented regions, their location and orientation may be used. Location and orientation, for example, can be determined by using first and second order moments of the binary object representing the segmented region as described above. The object or segmented region's center of mass in an x-y coordinate system and the object's axis of maximum elongation may be determined. The segmented region or object in one of the plurality of images or image sequence is selected as a base or reference. The base or reference image generally may be the first frame of the image sequence. The registration of each following images or frames is then defined by the translation needed to shift the center of mass and align the major axis to match the reference. This defines a homogenous transform to map intensity values form image points in the current image to the corresponding locations of the reference image.

In other embodiment, features may be extracted to perform registration. These features may include landmark points, for instance, using Lucas-Kanade method, correlation windows or areas, mutual information or other developed features. Those features in each of the images or frames in a sequence may be matched to the reference image, for example, by their intensity values. Briefly, Lucas-Kanade method may include automatically choosing key landmark points on the object for use in tracking the movements of the object. An optical flow estimation algorithm may be used to follow these movements, and the points that do not provide stable motion information is filtered out. With these points to specify frame-to-frame correspondence, the images are registered using third order polynomial fit across the image. This method provides a good stabilization of the object, although some movements may still occur along low contrast edges. Yet in another embodiment, elastic fitting with vector spline regularization may be used.

Any other transform model or mapping function may be used to transform the images over the reference image. Other methods that may be used for mapping include, but are not limited to, block matching and correlation that match corresponding regions for non-uniform warping.

At 508, interpolation is performed on the current image to define subpixel locations. Interpolation methods that may be used include but are not limited to bi-cubic interpolation, bilinear functions, splines, Gaussian, etc.

An image sequence registration method has been proposed that provides localized registration for specific regions and organs, for example, in intraoperative 2D medical image sequences. The IR image sets present challenges due to thermal noise and low contrast. Using the methodology of the present disclosure, segmentation of the image region can be first achieved, and overall registration applied to these regions. The methodology of the present disclosure may be implemented in real-time using available hardware and software.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method for image registration, comprising:
   automatically segmenting a region of an image having a low contrast border with respect to region's surroundings in the image, for each of a plurality of images in an image sequence of a moving object, said automatically segmenting step producing a plurality of segmented regions each representing the object;
   establishing an image from said plurality of images as a reference image;
   estimating an alignment error associated with each of the segmented regions relative to the reference image;
   defining one or more transform functions to map a segmented region of said reference image with segmented regions of rest of said plurality of images;
   mapping said segmented region of said reference image with said segmented regions of rest of said plurality of images; and
   determining sub-pixel information of said segmented regions of rest of said plurality of images using interpolation.

2. The method of claim 1, wherein said automatically segmenting step includes using edge detection combined with one or more morphological operations.

3. The method of claim 2, wherein said edge detection include Canny edge detection.

4. The method of claim 2, wherein said one or more morphological operations include bridging, dilating, binary connectivity analysis, opening, or combinations thereof.

5. The method of claim 1, wherein said defining one or more transform functions includes defining moments, features, correlation windows, mutual information, block matching, correlation that match corresponding regions for non-uniform warping, or combinations thereof.

6. The method of claim 1, wherein said interpolation include bilinear interpolation, bicubic interpolation, splines, Gaussians, or combinations thereof.

7. The method of claim 1, wherein said region of an image is a living organ.

8. A system for image registration, comprising:
   a processor;
   means for automatically segmenting a region of an image having a low contrast border with respect to region's surroundings in the image, for each of a plurality of images in an image sequence of a moving object, said automatically segmenting step producing a plurality of segmented regions each representing the object;
   means for establishing an image from said plurality of images as a reference image;
   means for defining a transform function to map a segmented region of said reference image with segmented regions of rest of said plurality of images;
   means for mapping said segmented region of said reference image with said segmented regions of rest of said plurality of images; and
   means for determining sub-pixel information of said segmented regions of rest of said plurality of images using interpolation.

9. The system of claim 8, wherein said automatically segmenting step includes using edge detection combined with one or more morphological operations.

10. The system of claim 9, wherein said edge detection include Canny edge detection.

11. The system of claim 9, wherein said one or more morphological operations include bridging, dilating, binary connectivity analysis, opening, or combinations thereof.

12. The system of claim 8, wherein said defining a transform function step includes defining moments, features, correlation windows, mutual information, block matching, correlation that match corresponding regions for non-uniform warping, or combinations thereof.

13. The system of claim 8, wherein said interpolation include bilinear interpolation, bicubic interpolation, splines, Gaussians, or combinations thereof.

14. The system of claim 8, wherein said region of an image is a living organ.

15. A program storage device readable by a machine, tangibly embodying a program of instructions executable by the machine to perform a method of image registration, comprising:
   automatically segmenting a region of an image having a low contrast border with respect to region's surroundings in the image, for each of a plurality of images in an image sequence of a moving object, said automatically segmenting step producing a plurality of segmented regions each representing the object;
   establishing an image from said plurality of images as a reference image;
   defining one or more transform functions to map a segmented region of said reference image with segmented regions of rest of said plurality of images;
   mapping said segmented region of said reference image with said segmented regions of rest of said plurality of images to align the segmented regions of rest of said plurality of images with the segmented region of the reference image; and
   determining sub-pixel information of said segmented regions of rest of said plurality of images using interpolation.

16. The program storage device of claim 15, wherein said automatically segmenting step includes using edge detection combined with one or more morphological operations.

17. The program storage device of claim 16, wherein said edge detection include Canny edge detection.

18. The program storage device of claim 16, wherein said one or more morphological operations include bridging, dilating, binary connectivity analysis, opening, or combinations thereof.

19. The program storage device of claim 15, wherein said defining a transform function step includes defining moments, features, correlation windows, mutual information, block matching, correlation that match corresponding regions for non-uniform warping, or combinations thereof.

20. The program storage device of claim 15, wherein said interpolation include bilinear interpolation, bicubic interpolation, splines, Gaussians, or combinations thereof.

21. The program storage device of claim 15, wherein said region of an image is a living organ.

22. A computer-implemented method for image registration, comprising:
   automatically segmenting a region of an image having a low contrast border with respect
   to region's surroundings in the image, for a plurality of images in an image sequence of a moving object, said automatically segmenting step producing a plurality of segmented regions representing the same object;
   establishing an image from said plurality of images as a reference image;
   defining a transform function to map a segmented region of said reference image with segmented regions of one or more of remaining said plurality of images, said segmented region of said reference image and said segmented regions of one or more of remaining said plurality of images obtained from said automatically segmenting step;
   mapping said segmented region of said reference image with said segmented regions of said one or more of remaining plurality of images to align the segmented region of the reference image with the segmented regions of said one or more of remaining plurality of images; and
   determining sub-pixel information of said segmented regions of plurality of images using interpolation.

23. The method of claim 22, wherein said automatically segmenting step includes using edge detection combined with one or more morphological operations.

24. The method of claim 23, wherein said edge detection include Canny edge detection.

25. The method of claim 23, wherein said one or more morphological operations include bridging, dilating, binary connectivity analysis, opening, or combinations thereof.

26. The method of claim 22, wherein said defining a transform function step includes defining moments, features, correlation windows, mutual information, block matching, correlation that match corresponding regions for non-uniform warping, or combinations thereof.

27. The method of claim 22, wherein said automatically segmenting step includes using active contour modeling wherein a contour is calculated through an error minimization.

28. The method of claim 1, wherein said automatically segmenting step includes using active contour modeling wherein a contour is calculated through an error minimization.

* * * * *